United States Patent [19]

Tanahashi et al.

[11] 4,254,750
[45] Mar. 10, 1981

[54] INTERNAL COMBUSTION ENGINE WITH AN AUXILIARY COMBUSTION CHAMBER

[75] Inventors: Toshio Tanahashi; Yoshiharu Sakai, both of Toyota, Japan

[73] Assignee: Toyota Jidosha Kogyo Kabushiki Kaisha, Aichi, Japan

[21] Appl. No.: 791,031

[22] Filed: Apr. 26, 1977

[30] Foreign Application Priority Data

Mar. 1, 1977 [JP] Japan .................................. 52/20822

[51] Int. Cl.³ .............................................. F02B 23/00
[52] U.S. Cl. .................................... 123/269; 123/260; 123/285; 123/286
[58] Field of Search ............ 123/32 SP, 32 ST, 32 K, 123/32 L, 191 S, 191 SP, 193 CH

[56] References Cited

U.S. PATENT DOCUMENTS

| | | | |
|---|---|---|---|
| 1,782,395 | 11/1930 | Bullington | 123/191 SP |
| 3,982,504 | 9/1976 | Noguchi et al. | 123/32 SP |
| 4,038,959 | 8/1977 | Takizawa et al. | 123/191 SP |
| 4,041,923 | 8/1977 | Konishi et al. | 123/191 S |

*Primary Examiner*—P. S. Lall

*Attorney, Agent, or Firm*—Stevens, Davis, Miller & Mosher

[57] ABSTRACT

Disclosed is an internal combustion engine comprising a main combustion chamber and an auxiliary combustion chamber interconnected by two connecting passages with each other. A raised portion having a flat lower end face is formed on the inner wall of the cylinder head. A squish area is formed between the flat lower end face of the raised portion and the flat top surface of the piston when the piston reaches the top dead center. The spark gap of the spark plug is located in a first one of the connecting passages or in the auxiliary combustion chamber at a position near the first connecting passage. The first connecting passage is so arranged that the squish flow passes through in front of the opening of the first connecting passage for decelerating the combustible mixture stream forced into the auxiliary combustion chamber via the first connecting passage at the time of the compression stroke. The second connecting passage is arranged at a position wherein the squish flow does not obstruct the combustible mixture stream forced into the auxiliary combustion chamber via the second connecting passage at the time of the compression stroke.

3 Claims, 5 Drawing Figures

INTERNAL COMBUSTION ENGINE WITH AN AUXILIARY COMBUSTION CHAMBER

DESCRIPTION OF THE INVENTION

The present invention relates to an internal combustion engine with an auxiliary combustion chamber.

There has been known an internal combustion engine in which its combustion chamber comprises a main combustion chamber and an auxiliary combustion chamber interconnected by a connecting passage with each other, and a spark plug is disposed in the connecting passage or in the auxiliary combustion chamber at a position near the connecting passage. In this engine, at the time of the intake stroke, a combustible mixture is introduced into the main combustion chamber. Then, at the time of the compression stroke, the combustible mixture is forced into the auxiliary combustion chamber via the connecting passage. After this, the combustible mixture in the auxiliary combustion chamber is ignited by the spark plug and, then, a burning jet is injected into the main combustion chamber from the connecting passage. The combustible mixture in the main combustion chamber is burned by the burning jet.

In an internal combustion engine of this type, since the residual exhaust gas created by the combustion in the preceding cycle and remaining around the electrode of the spark plug is fully scavenged by the combustible mixture forced into the auxiliary combustion chamber via the connecting passage at the time of the compression stroke, even if a lean air-fuel mixture or an air-fuel mixture containing recirculated exhaust gas therein is used, an ease of ignition can be obtained. In addition, a turbulent burning is caused by the burning jet in the main combustion chamber and, as a result, the speed of combustion is quickened, thus obtaining a stable combustion.

However, when the engine is operating at a high speed, the combustible mixture is forced into the auxiliary combustion chamber via the connecting passage at a high velocity. Consequently, if the electrode of the spark plug is located in the connecting passage or in the auxiliary combustion chamber at a position near the connecting passage, a discharging arc created in the spark gap of the spark plug is extinguished by the high speed stream of the combustible mixture, and as a result, there occurs a problem in that a misfire is caused.

As a method for preventing the occurrence of misfire, there is a method in which the cross-sectional area of the connecting passage is increased so that the velocity of the combustible mixture flowing in the connecting passage at the time of the compression stroke is reduced, thereby preventing a discharging arc from being extinguished. However, if the cross-sectional area of the connecting passage is enlarged as mentioned above, there occurs a problem in that a strong burning jet can not be obtained.

An object of the present invention is to provide an internal combustion engine with an auxiliary combustion chamber capable of preventing the occurrence of misfire at the time of high engine speed while always obtaining a strong burning jet.

According to the present invention, there is provided an internal combustion engine comprising: a cylinder block; a cylinder head mounted on said cylinder block and having a cavity therein and an inner surface, said cavity having an inner wall defining an auxiliary combustion chamber; a piston reciprocally movable in said cylinder block and having a top surface; a main combustion chamber formed between the top surface of said piston and the inner wall of said cylinder head; an intake valve movably mounted on said cylinder head for leading a combustible mixture into said main combustion chamber; an exhaust valve movably mounted on said cylinder head for discharging an exhaust gas into the atmosphere; squish flow producing means formed by the top surface of said piston and by the inner wall of said cylinder head for forming a squish area which extends along the periphery of the inner surface of said cylinder head and creates a squish flow flowing towards the central portion of said main combustion chamber when said piston reaches the vicinity of the top dead center; a first connecting passage communicating said main combustion chamber with said auxiliary combustion chamber and having an open end which is located near said squish area, and opening into said main combustion chamber at a position wherein said squish flow passes through in front of said open end for obstructing a combustible mixture stream flowing into said auxiliary combustion chamber via said first connecting passage at the time of the compression stroke so that said combustible mixture stream is decelerated; a spark plug having a spark gap located in an auxiliary chamber region consisting of said connecting passage and said auxiliary combustion chamber, and arranged to be directly exposed to said combustible mixture stream, and; a second connecting passage communicating said main combustion chamber with said auxiliary combustion chamber and arranged at a position remote from said squish area so that said squish flow does not obstruct a combustible mixture stream flowing into said auxiliary combustion chamber via said second connecting passage at the time of the compression stroke.

The present invention may be more fully understood from the description set forth below of preferred embodiment of the invention, together with the accompanying drawings.

DESCRIPTION OF PREFERRED EMBODIMENTS

Figure 1:
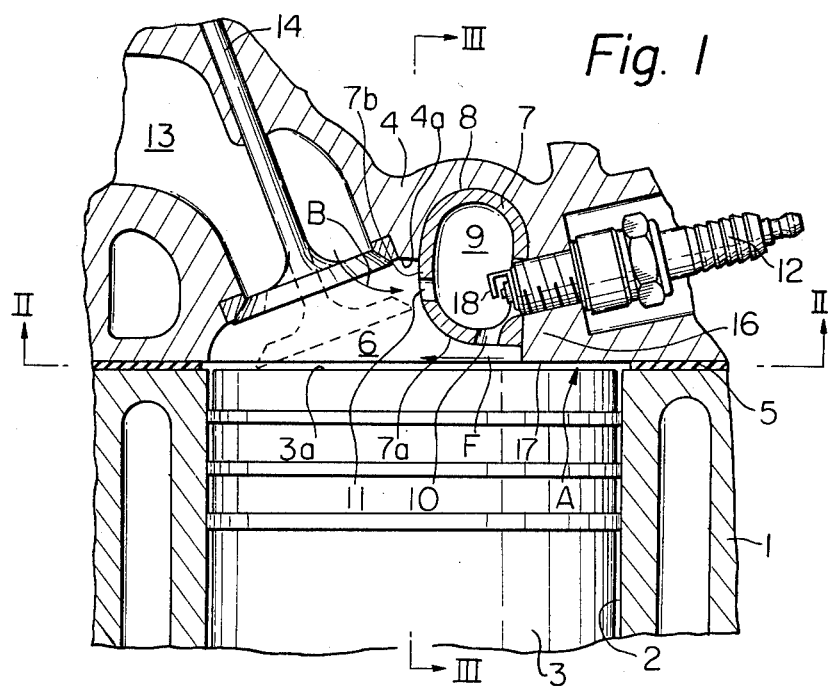
FIG. 1 is a cross-sectional side view of an embodiment of an internal combustion engine according to the present invention, taken along the line I—I in FIG. 2.
Figure 2:
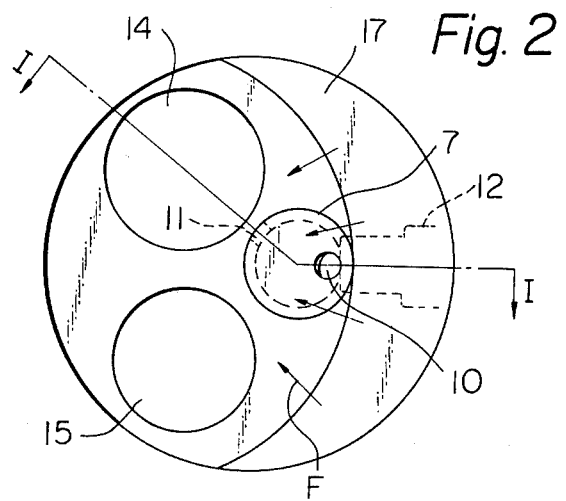
FIG. 2 is a bottom view of the cylinder head, taken along the line II—II in FIG. 1.
Figure 5:
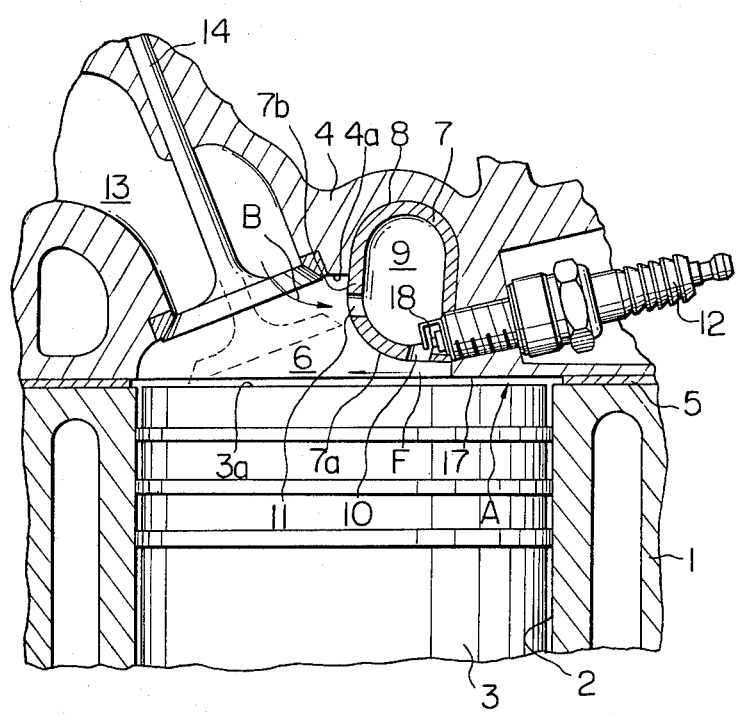
FIG. 5 is a cross-sectional side view of an alternative embodiment according to the present invention.

Referring to FIGS. 1 and 2, 1 designates an cylinder block, 2 a cylinder bore formed in the cylinder block 1, 3 a piston reciprocally movable in the cylinder bore 2 and 4 a cylinder head fixed onto the cylinder block 1 via a gasket 5; 6 designates a main combustion chamber formed between the top surface 3a of the piston 3 and the inner wall 4a of the cylinder head 4, 7 an auxiliary chamber component press-fitted into a recess 8 formed in the cylinder head 4, 9 an auxiliary combustion chamber formed in the auxiliary chamber component 7 and 10 a first connecting passage communicating the auxiliary combustion chamber 9 with the main combustion chamber 6; 11 designates a second connecting passage communicating the auxiliary combustion chamber 9 with the main combustion chamber 6, 12 a spark plug, 13 an intake port formed in the cylinder head 4, 14 an intake valve and 15 an exhaust valve (FIG. 2). A raised portion 16 projecting downwards is formed on the inner wall 4a of the cylinder head 4 and the lower end portion of the raised portion 16 is formed as a flat surface 17 having a crescent shape as shown in FIG. 2. On the other hand, the top surface 3a of the piston 3 is flat. In addition, the raised portion 16 is so arranged that a small gap is formed between the crescent shaped flat surface 17 of the raised portion 16 and the flat top surface 3a of the piston 3 when the piston 3 reaches the top dead center as is shown in FIG. 1. Consequently, when the piston 3 reaches the top dead center, a crescent shape squish area A is formed between the crescent shape flat surface 17 of the raised portion 16 and the flat top surface 3a of the piston 3. The lower end face 7a of the auxiliary chamber component 7 is positioned slightly above the horizontal plane including the crescent shape flat surface 17 and is arranged so as to be approximately parallel to the above-mentioned horizontal plane. The first connecting passage 10 is formed in the auxiliary chamber component 7 on the squish area side, with respect to the axis of the auxiliary chamber component 7, and is so arranged that the opening of the first connecting passage 10 is directed to the central portion of the top surface 3a of the piston 3. The electrode 18 of the spark plug 12 is located in the auxiliary combustion chamber 9 at a position near the first connecting passage 10, or in the first connecting passage 10 as is shown in FIG. 5, and is arranged at a position wherein the combustible mixture forced into the auxiliary combustion chamber 9 via the first connecting passage 10 at the time of the compression stroke directly impinges against the electrode 18 of the spark plug 12. On the other hand, the second connecting passage 11 is formed on the circumferential wall 7b of the auxiliary chamber component 7, at a position near the intake valve 14, and is so arranged that the opening of the second connecting passage 11 is directed to the valve head of the intake valve 14. The axis of the second connecting passage 11 is arranged in a skew position with respect to the axis of the first connecting passage 10, so that the combustible mixture introduced into the auxiliary combustion chamber 9 via the second connecting passage 11 at the time of the intake stroke flows in the auxiliary combustion chamber 9 in the form of a loop and, then, the combustible mixture is discharged into the main combustion chamber 6 via the first connecting passage 10. In addition, the first and the second connecting passages 10 and 11 open into the auxiliary combustion chamber 9 tangentially to the inner wall of the auxiliary combustion chamber 9 so that, at the time of the compression stroke, the combustible mixture introduced into the auxiliary combustion chamber 9 via the first connecting passage 10 causes a swirl motion in the auxiliary combustion chamber 9, which rotates in the same direction as the swirl motion caused by the combustible mixture introduced into the auxiliary combustion chamber 9 via the second connecting passage 11, whereby a strong swirl motion of the combustible mixture is created in the auxiliary combustion chamber 9.

Figure 3:
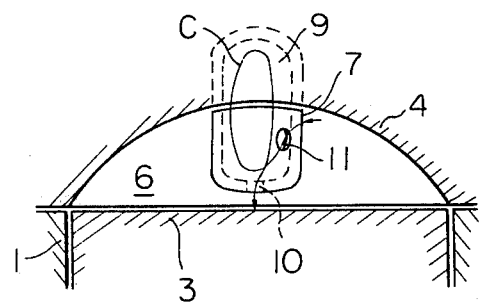
FIG. 3 is a side view taken along the line III—III in FIG. 1.

In operation, at the time of the intake stroke, the intake valve 14 is opened, as shown by a broken line in FIG. 1, and a lean air-fuel mixture or an air-fuel mixture containing a large amount of recirculated exhaust gas therein is introduced into the main combustion chamber 6 from the intake port 13 via the intake valve 14. The flow direction of the combustible mixture introduced into the main combustion chamber 6 is deflected by the rear surface of the valve head of the intake valve 14, as shown by an arrow B in FIG. 1 and, then, a part of the combustible mixture is introduced into the auxiliary combustion chamber 9 via the second connecting passage 11. The combustible mixture thus introduced into the auxiliary combustion chamber 9 flows in the auxiliary combustion chamber 9 in the form of a loop without intercrossing, as shown by an arrow C in FIG. 3, and then, the combustible mixture is discharged into the main combustion chamber 6 via the first connecting passage 10. Consequently, the residual exhaust gas created by the combustion in the preceding cycle and remaining in the auxiliary combustion chamber 9 is scavenged by the combustible mixture introduced into the auxiliary combustion chamber 9 via the second connecting passage 11. However, in this loop scavenging, the scavenging operation of the residual exhaust gas remaining around the electrode 18 of the spark plug 12, which is sufficient to obtain a good ignition, can not be carried out.

Figure 4:
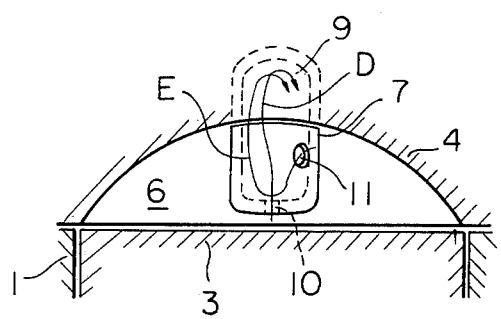
FIG. 4 is a side view taken along the line III—III in FIG. 1.

At the time of the compression stroke, the combustible mixture in the main combustion chamber 6 is forced into the auxiliary combustion chamber 9 via the first and the second connecting passages 10 and 11. At this time, as shown by the arrows D and E in FIG. 4, the combustible mixture D forced into the auxiliary combustion chamber 9 via the first connecting passage 10 causes a swirl motion in the auxiliary combustion chamber 9, which rotates in approximately the same direction as a swirl motion caused by the combustible mixture E forced into the auxiliary combustion chamber 9 via the second connecting passage 11. In addition, at this time, the residual exhaust gas remaining around the electrode 18 of the spark plug 12, which can not be fully removed by the loop scavenging operation at the time of the intake stroke, is completely scavenged by the combustible mixture forced into the auxiliary combustion chamber 9 via the first connecting passage 10. When the piston 3 approaches the top dead center, as shown by the arrow F in FIGS. 1 and 2, a squish flow is pushed out from the squish area A towards the central portion of the top surface 3a of the piston 3 along the top surface 3a of the piston 3. Since this squish flow operates so as to obstruct the combustible mixture stream flowing towards the first connecting passage, the combustible mixture stream forced into the auxiliary combustion chamber 9 via the first connecting passage 10 is decelerated. Such a squish flow becomes strong as the speed of the engine is increased. Therefore, the decelerating operation of the combustible mixture stream flowing in the first connecting passage 10, which is caused by the squish flow, becomes strong as the speed of the engine is increased. Consequently, even if the engine is operating at a high speed, the velocity of the combustible mixture flowing around the electrode 18 of the spark plug 12 is slow at the time of ignition. As a result of this, the combustible mixture can be easily ignited by the spark plug 12.

As is mentioned above, a strong swirl motion of the combustible mixture is created in the auxiliary combustion chamber 9. Consequently, after ignition, a flame rapidly propagates over the entire space of the auxiliary combustion chamber 9 and, thus, a strong burning jet is injected into the main combustion chamber 6 via the first and the second connecting passages 10 and 11. Since turbulence is caused by the squish flow in the main combustion chamber 6 and the turbulence is further strengthened by the strong burning jet, the turbulent burning of the combustible mixture is caused in the main combustion chamber 6. As a result of this, the speed of the combustion is extremely quickened and, thus, a stable combustion is carried out.

The present invention can be applied to a stratified engine in which the auxiliary chamber provided with an additional intake valve is connected to the main combustion chamber via the connecting passage, and the electrode of the spark plug is located in the auxiliary combustion chamber. In this engine, a rich air-fuel mixture is introduced into the auxiliary combustion chamber via the additional intake valve, while a lean air-fuel mixture is introduced into the main combustion chamber at the time of the compression stroke. Then, the rich air-fuel mixture in the auxiliary combustion chamber is ignited by the spark plug and, as a result, a burning jet is injected into the main combustion chamber from the auxiliary combustion chamber. Then, the lean air-fuel mixture in the main combustion chamber is burned by the burning jet.

In a stratified engine of this type, since the lean air-fuel mixture introduced into the main combustion chamber is forced into the auxiliary combustion chamber at the time of the intake stroke, the rich air-fuel mixture in the auxiliary combustion chamber is diluted by the lean air-fuel mixture. Consequently, in this engine, an extremely rich air-fuel mixture must be fed into the auxiliary combustion chamber for creating an air-fuel mixture of an optimum air-fuel ratio necessary to obtain an ease of ignition in the auxiliary combustion chamber. However, in this case, if liquid fuel is fed into the auxiliary combustion for forming a rich air-fuel mixture therein, a misfire is caused. Consequently, in this engine, in order to promote the vaporization of the fuel, it is necessary to strongly heat a rich air-fuel mixture supply passage. However, such strong heating brings about a decrease in the volumetric efficiency of the engine and, as a result, the output power of the engine is decreased.

However, in a stratified engine of the above-mentioned type, if the main combustion chamber is constructed in such a manner that a squish area is formed between the piston and the cylinder head in the vicinity of the opening of the connecting passage in the same manner as that of the embodiment shown in FIG. 1, so that the lean air-fuel mixture flowing into the auxiliary combustion chamber via the connecting passage at the time of the compression stroke is obstructed by the squish flow, the amount of lean air-fuel mixture introduced into the auxiliary combustion chamber via the connecting passage is reduced compared with that of the lean air-fuel mixture in a conventional engine. Consequently, a rich air-fuel mixture, which is leaner than that used in a conventional engine, can be used and, as a result, there is no need of strongly heating the rich air-fuel mixture supply passage as in a conventional engine. Thus, the volumetric efficiency of the engine is improved, whereby the output power of the engine can be increased.

According to the present invention, since the combustible mixture stream flowing around the electrode of the spark plug is decelerated by the squish flow, even if the engine is operating at a high speed, there is no danger that the discharging arc created in the spark gap of the spark plug will be extinguished by the high speed stream of the combustible mixture. As a result of this, a good ignition can be always obtained. In addition, even if a lean air-fuel mixture or an air-fuel mixture containing a large amount of recirculated exhaust gas therein is used, the combustible mixture can be easily ignited. Then, since rapid combustion is caused in the auxiliary combustion chamber, a strong burning jet can be injected into the main combustion chamber via the connecting passage.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block;
   a cylinder head mounted on said cylinder block and having a cavity therein and an inner surface on which is formed a raised portion projecting downward and having a flat lower end face, said cavity having an inner wall defining an auxiliary combustion chamber;
   a piston reciprocally movable in said cylinder block and having a flat top surface;
   a main combustion chamber formed between the top surface of said piston and the inner wall of said cylinder head;
   an intake valve having a head, said valve being mounted to reciprocate in said cylinder head for leading a combustible mixture into said main combustion chamber;
   an exhaust valve movably mounted on said cylinder head for discharging an exhaust gas into the atmosphere;
   squish flow producing means formed by the flat top surface of said piston and by the inner wall of said cylinder head for forming a squish area between said flat lower end face of said raised portion and the flat top surface of said piston which extends along the periphery of the inner surface of said cylinder head and creates a squish flow flowing towards the central portion of said main combustion chamber when said piston reaches the vicinity of the top dead center;
   a first passage connecting said main combustion chamber with said auxiliary combustion chamber and having an open end which is located near said squish area, and opening into said main combustion chamber at a position wherein said squish flow passes through in front of said open end for obstructing flow of a combustible mixture stream into said auxiliary combustion chamber via said first connecting passage at the time of the compression stroke so that said combustible mixture stream is decelerated;
   a spark plug having a spark gap located in an auxiliary chamber region consisting of said connecting passage and said auxiliary combustion chamber, and arranged to be directly exposed to said combustible mixture stream; and
   a second passage connecting said main combustion chamber with said auxiliary combustion chamber, the mouth of said second connecting passage facing the head of the intake valve and being located at a position remote from said squish area so that said squish flow does not obstruct a combustible mixture stream flowing into said auxiliary combustion chamber via said second connecting passage at the time of the compression stroke, the flow axes of said first and second connecting passages being mutually askew.

2. An internal combustion engine as claimed in claim 1, wherein said first and said second connecting passages open into said auxiliary combustion chamber tangentially to the inner wall of said auxiliary combustion chamber for creating a swirl motion of the combustible mixture in said auxiliary combustion chamber at the time of the compression stroke.

3. An internal combustion engine comprising:
a cylinder block;
a cylinder head mounted on said cylinder block and having a cavity therein and an inner surface on which is formed a raised portion projecting downward and having a flat lower end face, said cavity having an inner wall defining an auxiliary combustion chamber;
a piston reciprocally movable in said cylinder block and having a flat top surface;
a main combustion chamber formed between the top surface of said piston and the inner wall of said cylinder head;
an intake valve movably mounted on said cylinder head for leading a lean air-fuel mixture into said main combustion chamber;
an additional intake valve movably mounted on said cylinder head for leading a rich air-fuel mixture into said auxiliary combustion chamber;
an exhaust valve movably mounted on said cylinder head for discharging an exhaust gas into the atmosphere;
squish flow producing means formed by the flat top surface of said piston and by the inner wall of said cylinder head for forming a squish area between said flat lower end face of said portion and the flat top surface of said piston which extends along the periphery of the inner surface of said cylinder head and creates a squish flow flowing towards the central portion of said main combustion chamber when said piston reaches the vicinity of the top dead center;
a passage connecting said main combustion chamber with said auxiliary combustion chamber and having a mouth which is located near said squish area and which opens into said main combustion chamber at a position such that said squish flow passes through in front of said mouth to prevent a combustible mixture stream from flowing into said auxiliary combustion chamber via said connecting passage at the time of the compression stroke so that said combustible mixture stream is decelerated; and
a spark plug having a spark gap located in an auxiliary chamber region consisting of said connecting passage and said auxiliary combustion chamber.

* * * * *